US010700994B2

(12) United States Patent
Kusters et al.

(10) Patent No.: US 10,700,994 B2
(45) Date of Patent: *Jun. 30, 2020

(54) MULTI-TENANT THROTTLING APPROACHES

(71) Applicant: Amazon Tchnologies, Inc., Reno, NV (US)

(72) Inventors: Norbert Kusters, Redmond, WA (US);
Kerry Q. Lee, Seattle, WA (US);
Raghav Vijay Pisolkar, Seattle, WA (US); Tate Andrew Certain, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 166 days.

This patent is subject to a terminal disclaimer.

(21) Appl. No.: 15/231,398

(22) Filed: Aug. 8, 2016

(65) Prior Publication Data

US 2016/0344651 A1    Nov. 24, 2016

Related U.S. Application Data

(63) Continuation of application No. 13/627,278, filed on Sep. 26, 2012, now Pat. No. 9,413,680.

(51) Int. Cl.
*G06F 15/177* (2006.01)
*H04L 12/923* (2013.01)
(Continued)

(52) U.S. Cl.
CPC ........ *H04L 47/762* (2013.01); *H04L 12/1403* (2013.01); *H04L 41/08* (2013.01);
(Continued)

(58) Field of Classification Search
CPC combination set(s) only.
See application file for complete search history.

(56) References Cited

U.S. PATENT DOCUMENTS 5,831,971 A * 11/1998 Bonomi ............. H04Q 11/0478
370/230
6,438,595 B1 * 8/2002 Blumenau ............. G06F 9/5083
709/226

(Continued)

OTHER PUBLICATIONS

"Non Final Office Action dated Sep. 17, 2014" received in U.S. Appl. No. 13/627,278.

(Continued)

*Primary Examiner* — Anthony Mejia
(74) *Attorney, Agent, or Firm* — Hogan Lovells US LLP

(57) ABSTRACT

An opportunistic throttling approach can be used for customers of shared resources in a multi-tenant environment. Each customer can have a respective token bucket with a guaranteed fill rate. When a request is received for an amount of work to be performed by a resource, the corresponding number of tokens are obtained from, or charged against, a global token bucket. If the global bucket has enough tokens, and if the customer has not exceeded a maximum work rate or other such metric, the customer can charge less than the full number of tokens against the customer's token bucket, in order to reduce the number of tokens that need to be taken from the customer bucket. Such an approach can enable the customer to do more work and enable the customer's bucket to fill more quickly as fewer tokens are charged against the customer bucket for the same amount of work.

20 Claims, 5 Drawing Sheets

(51) Int. Cl.
  *H04L 29/08* (2006.01)
  *H04M 15/00* (2006.01)
  *H04L 12/14* (2006.01)
  *H04L 12/24* (2006.01)
  *H04L 29/06* (2006.01)

(52) U.S. Cl.
  CPC .......... *H04L 67/146* (2013.01); *H04L 69/321* (2013.01); *H04L 69/325* (2013.01); *H04M 15/765* (2013.01); *H04M 15/7652* (2013.01); *H04M 15/7655* (2013.01); *H04M 15/83* (2013.01); *H04M 15/85* (2013.01); *H04M 15/853* (2013.01); *H04M 15/854* (2013.01); *H04L 63/10* (2013.01)

(56) References Cited

U.S. PATENT DOCUMENTS

| | | | | |
|---|---|---|---|---|
| 7,450,591 | B2* | 11/2008 | Korling | H04L 12/14 370/395.21 |
| 7,646,718 | B1* | 1/2010 | Kondapalli | H04L 41/0896 370/230 |
| 7,873,048 | B1* | 1/2011 | Kondapalli | H04L 47/30 370/392 |
| 7,948,882 | B2* | 5/2011 | Chin | H04L 47/10 370/230 |
| 8,103,769 | B1* | 1/2012 | Weiser | G06F 9/5011 709/225 |
| 8,468,251 | B1* | 6/2013 | Pijewski | G06F 9/5072 709/226 |
| 8,593,969 | B1* | 11/2013 | Kondapalli | H04L 41/0896 370/235.1 |
| 8,634,335 | B1* | 1/2014 | Kondapalli | H04L 47/30 370/310 |
| 8,706,864 | B1* | 4/2014 | Brandwine | H04L 41/5019 709/224 |
| 8,775,601 | B2* | 7/2014 | O'Sullivan | H04L 29/08468 709/203 |
| 9,413,680 | B1* | 8/2016 | Kusters | H04L 67/146 |
| 2004/0213158 | A1* | 10/2004 | Collett | H04L 47/10 370/235 |
| 2004/0255143 | A1* | 12/2004 | Wemyss | G06F 21/335 726/9 |
| 2005/0232150 | A1* | 10/2005 | Nishimura | H04L 47/10 370/230 |
| 2006/0008063 | A1* | 1/2006 | Harnesk | H04L 12/14 379/114.01 |
| 2006/0114912 | A1* | 6/2006 | Kwan | H04L 47/10 370/395.4 |
| 2008/0008095 | A1* | 1/2008 | Gilfix | H04L 47/10 370/235 |
| 2008/0084824 | A1* | 4/2008 | Chin | H04L 47/10 370/235.1 |
| 2008/0123689 | A1* | 5/2008 | Oren | H04L 47/527 370/468 |
| 2010/0135229 | A1* | 6/2010 | Lohr | H04W 72/1284 370/329 |
| 2010/0202295 | A1* | 8/2010 | Smith | H04L 47/10 370/235.1 |
| 2011/0199899 | A1* | 8/2011 | Lemaire | H04L 47/2416 370/230.1 |
| 2013/0047246 | A1* | 2/2013 | Radhakrishnan | G06F 21/335 726/9 |
| 2014/0258546 | A1* | 9/2014 | Janssens | G06F 9/5088 709/226 |

OTHER PUBLICATIONS

"Final Office Action dated Mar. 5, 2015" received in U.S. Appl. No. 13/627,278.
"Non Final Office Action dated Jun. 1, 2015" received in U.S. Appl. No. 13/627,278.
"Final Office Action dated Oct. 21, 2015" received in U.S. Appl. No. 13/627,278.
"Notice of Allowance dated Apr. 12, 2016" received in U.S. Appl. No. 13/627,278.

* cited by examiner

MULTI-TENANT THROTTLING APPROACHES

CROSS-REFERENCES TO RELATED APPLICATIONS

This application is a continuation of allowed U.S. application Ser. No. 13/627,278 entitled "MULTI-TENANT THROTTLING APPROACHES," filed Sep. 26, 2012, which is incorporated herein by reference for all purposes.

BACKGROUND

As an increasing number of applications and services are being made available over networks such as the Internet, an increasing number of content, application, and/or service providers are turning to technologies, such as cloud computing, that enable multiple users to share electronic resources. Access to these electronic resources is often provided through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

In at least some cloud computing environments, certain customers are provided with guaranteed levels of service. A cloud provider must then provide enough electronic resources to support these guarantees. Since it is uncommon for all the customers to be using their full guaranteed rates at all times, the resources can be underutilized. Further, certain customers might want to utilize more than their guarantees which can prevent other customers from reaching their guarantees, or can at least slow down the system. One conventional approach to solving this problem is to throttle customers when those customers attempt to exceed an allocated rate. While such an approach can guarantee resource availability, throttling can still result in underutilized resources that could be utilized by customers to perform more work while the resources do not have a full workload.

BRIEF DESCRIPTION OF THE DRAWINGS

Various embodiments in accordance with the present disclosure will be described with reference to the drawings, in which.

DETAILED DESCRIPTION

Figure 1:
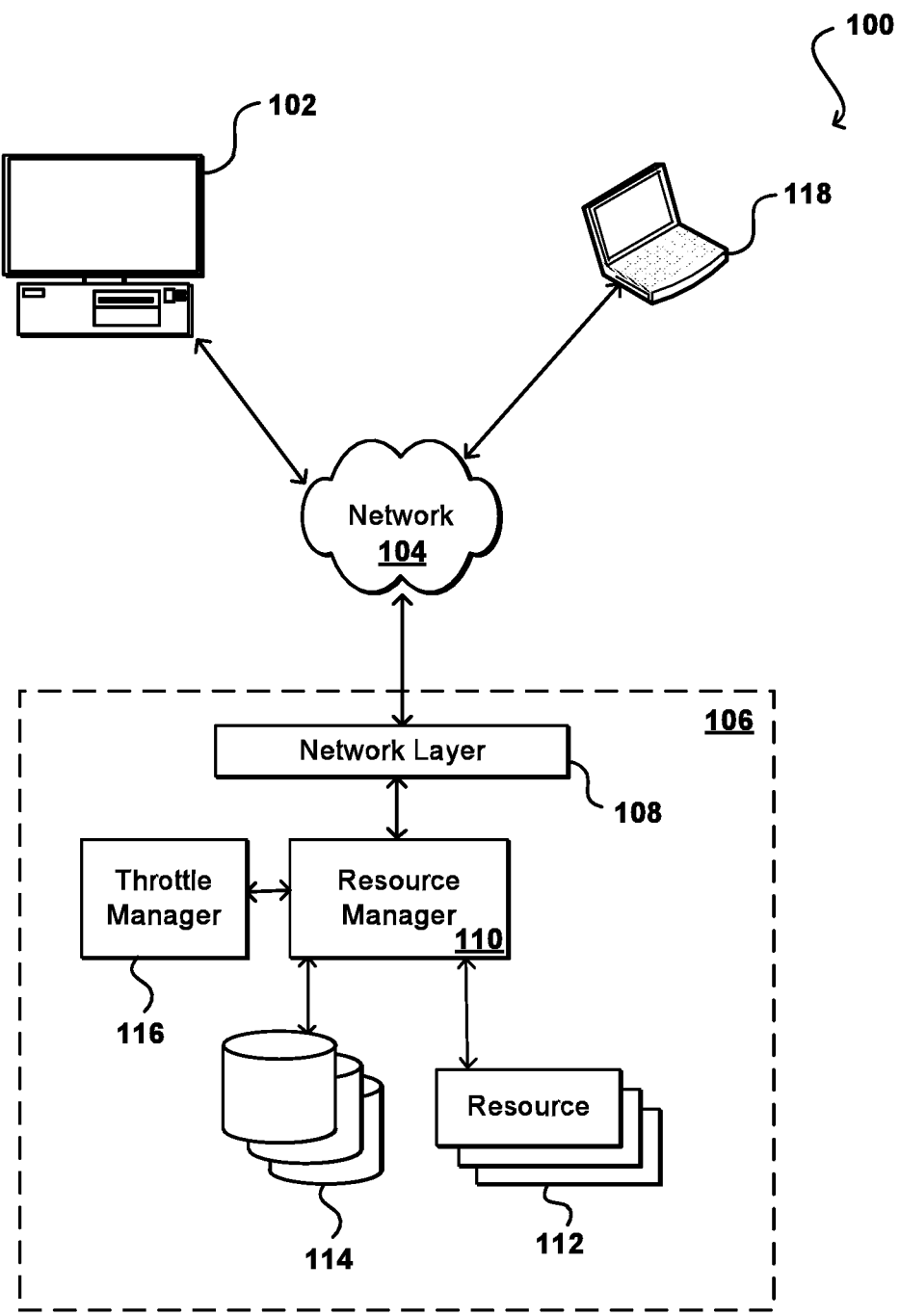
FIG. 1 illustrates an environment in which various embodiments can be implemented.

Systems and methods in accordance with various embodiments of the present disclosure overcome one or more of the aforementioned and other deficiencies experienced in conventional approaches to managing access to shared electronic resources in a multi-tenant environment. In particular, various embodiments utilize an "opportunistic" token bucket approach, wherein customers (e.g., client devices, computing resources, applications, services, etc.) of the multi-tenant environment can each obtain a customer-specific token bucket with a specified size and a guaranteed fill rate. The customer-specific token bucket is a virtual container that can hold virtual tokens, each of which entitles the customer to obtain an amount of processing, access, or other such unit of work from at least one type of electronic resource. When a customer has a task that requires a certain amount of work, the task can be processed by the appropriate resource(s) when the corresponding number of tokens, or a token of a particular size, is available in the customer-specific token bucket such that usage of those tokens for that amount of work can be charged against the customer bucket. If there are not enough tokens in the customer bucket, the customer must wait until the customer bucket fills, at the guaranteed fill rate, to the point where there are a sufficient number of tokens in the customer bucket.

Using an opportunistic token bucket approach, however, each customer charges tokens against a larger global token bucket, or global throttle. The global token bucket has a size that is larger than the sum of the sizes of the customer buckets, in at least some embodiments. In some embodiments, the additional tokens can be used for other customers, background workloads, and other such purposes. For each request that is received, the number of tokens for that request is charged against the global throttle. In various embodiments, at least some customers can have a secondary or "maximum" guaranteed rate that can be greater than the primary or "minimum" rate corresponding to the fill rate of the respective customer-specific bucket. Whether or not the customer is able to use more than the minimum rate can depend at least in part upon the number of tokens available in the global bucket. If there are more than a threshold number of tokens available in the global bucket, either before or after tokens are obtained for the customer request, less than the full number of tokens can be charged against the customer's bucket. Such an approach enables a customer to do more work and enables the customer's bucket to refill more quickly, as fewer tokens are being charged against the customer bucket when there are a sufficient number of tokens in the global bucket. A customer can run up to a maximum rate, charging only a specified portion (e.g., half) of the tokens against the customer bucket when the global token bucket has at least a threshold amount of tokens, but might have to charge the full amount against the customer bucket when there are no tokens left in the global token bucket. For token levels of the global bucket in-between, a customer might be able to charge less than the full number of tokens against the customer bucket, but more than the minimum charge (e.g., half).

Various other functions and advantages are described and suggested below as may be provided in accordance with the various embodiments.

FIG. 1 illustrates an example environment 100 that can be used in accordance with various embodiments. In this example, a first computing device 102 for an end user is shown to be able to make calls through a network 104 into a multi-tenant environment 106 to perform a task, such as to process a workload, provision a data repository, or perform another such task. The computing device, as well as at least one computing device 118 associated with one or more other end users, can be any appropriate device, such as a personal computer, notebook computer, smart phone, tablet computer, set-top box, and the like. While an end user computing device is used for purposes of explanation, it should be understood that any appropriate user, application, service, device, component, or resource can access components of the multi-tenant environment as appropriate in the various embodiments. Further, the network can be any appropriate wired and/or wireless network(s), such as a local area network (LAN), the Internet, an intranet, and/or a cellular network, among others.

The multi-tenant environment 106 in this example can be provided by what will be referred to herein as a resource provider. A request sent to the multi-tenant environment can be received to a network layer 108, such as a Web services layer or tier, which can include a number of components used for receiving and managing network traffic, as may include at least one Web server, for example, along with computer-executable software, application servers, or other such components. The network layer can include a set of APIs (or other such interfaces) for receiving requests (e.g., Web service calls) from across the network 104. Each API can be provided to receive requests for at least one specific action to be performed with respect to the multi-tenant environment, a specific type of resource to be accessed, etc. Upon receiving a request to one of the APIs, the network layer can parse or otherwise analyze the request to determine the steps or actions needed to process the request.

A network layer 108 in one embodiment includes a scalable set of customer-facing servers that can provide the various APIs and return the appropriate responses based on the API specifications. The network layer also can include at least one API service layer that in one embodiment consists of stateless, replicated servers which process the externally-facing customer APIs. The network layer can be responsible for front end features such as authenticating customers based on credentials, authorizing the customer, throttling customer requests to the API servers, and validating user input. In many embodiments, the network layer and/or API service layer will be the only externally visible component, or the only component that is visible to, and accessible by, various customers. The servers of the network layer can be stateless and scaled horizontally as known in the art.

In at least some embodiments, customer requests that require access to one or more resources in the multi-tenant environment can be directed to a resource manager 110. The resource manager can be one or more components provided in hardware and/or software, and can be responsible for tasks such as managing and provisioning physical and/or virtual resources and resource instances. In this example, the multi-tenant environment includes different types of resources, such as may include various types of data stores 114 and computing resources 112, such as servers and the like. The resource manager 110 can determine the type of resource(s) needed to process a request, the availability of the resource(s), and the ability of the customer to obtain access to the resource(s). This can include, for example, determining permissions or one or more resources, determining a type of the user or a type of request, etc. In addition, the resource manager 110 can also be configured to determine when to allow the request to be processed based on one or more throttling criteria.

In this example, the resource manager 110 is in communication with a throttling manager 116, which can also be implemented through a combination of hardware and software, such as an application or module executing on one or more computing devices. For example, the throttling manager 116 can be an application or service executing on one or more servers in the multi-tenant environment. The resource manager 110 can contact the throttling manager 116 when a request from a client device is received, in order to determine whether and/or when to process the request. For example, if the system has a certain amount of capacity and the client device (or customer associated with the client device) has not exceeded a maximum amount or rate of work, the request can be processed. In some situations, processing the request at the current time can cause the customer to exceed a maximum rate, such that the customer can be throttled whereby there will be some delay before the request will be processed.

Figure 2A:
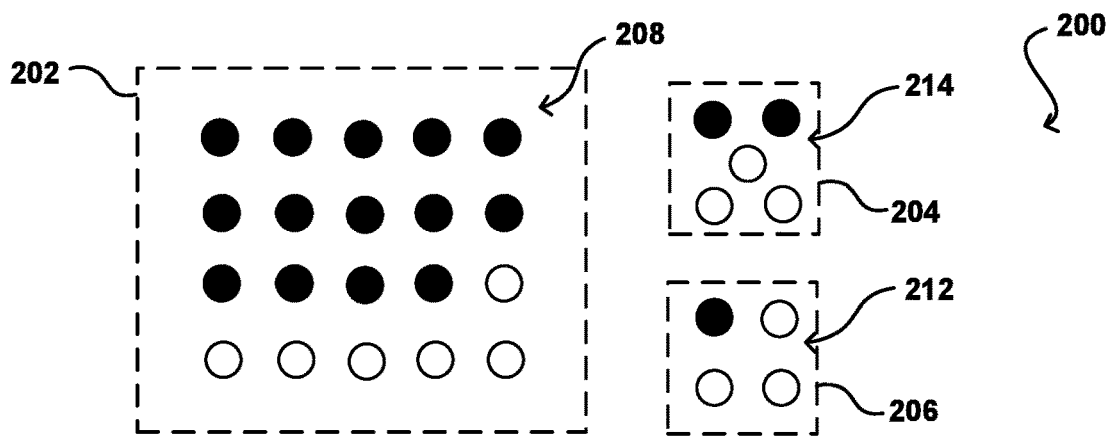
FIGS. 2(a), 2(b), and 2(c) illustrate an example approach to enabling a customer to charge tokens against a global throttle and against a local throttle that can be used in accordance with various embodiments.
Figure 2B:
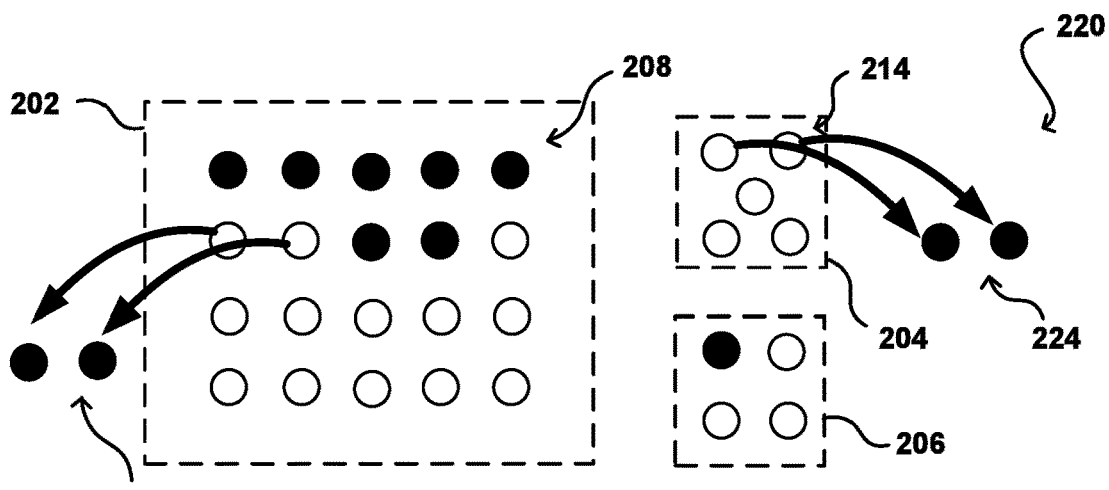

A throttle manager in at least some embodiments can manage workloads using a token-bucket, leaky-bucket, or other token-based throttling approach. FIG. 2(a) illustrates an example situation 200 wherein the throttle manager manages a global token bucket 202, or global throttle, as well as a number of customer-specific token buckets 204, 206 for various customers who can share resources, such as the customers 102, 118 illustrated in FIG. 1. As mentioned, each customer bucket 204, 206 will have a respective size and fill rate, and the global bucket 202 will also have a respective size and fill rate. The global bucket can have a size that is greater than the size of all the customer-specific buckets corresponding to the global bucket, such that tokens can be available in the global bucket even if all the customers are fully utilizing the tokens in the customer buckets. Further, the fill rate of the global bucket, or global throttle, should be set at a rate that is at least as great as the sum of the fill rates for the client-specific buckets, in order to ensure that the guaranteed rates for the customers can be met. The size and/or fill rate of the global bucket also should be set, at least some embodiments, to no greater than can be provided by the one or more shared resources supporting the global bucket. For example, if the customer buckets 204, 206 each have a fill rate of two tokens per unit time, the global bucket should have at least a fill rate of four tokens per unit time, and in some embodiments will have a fill rate of at least five tokens per unit time in order to allow for additional resource usage. It should be understood that the number of tokens, token buckets, and customers illustrated in the figures is small for purposes of clarity, but there can be any appropriate number of tokens, customers, and buckets with any appropriate size or arrangement within the scope of the various embodiments. In the figure, the black discs represent available tokens and the white discs represent tokens that have been charged to, or obtained from, the bucket, such that the global bucket 202 in FIG. 2(a) has fourteen of a possible twenty tokens available.

In one example, a customer associated with a first customer bucket 204 submits a request that requires two tokens. As illustrated in FIG. 2(a), there are two of five possible tokens 214 in the customer's bucket, such that the request does not need to be locally throttled. If the customer associated with the other customer bucket 206 had submitted that request, the request might be locally throttled as there is only one of four tokens 212 available in that bucket 206. In at least some approaches, a request for the second bucket 206 might have to wait until another token appears in that customer bucket, per the corresponding fill rate, in order to have the request processed.

When using a global bucket, the two tokens 222 for the request can first be charged against the global bucket 202. Charging the tokens against the global bucket, or global throttle, enables the global throttle to have a view of the amount of work being performed and/or requested against the respective resource(s). In this example, less than half of the total number of tokens are available in the global bucket. Accordingly, the customer in this example can only run at the guaranteed rate, as in conventional approaches. The two tokens 224 needed for the request must be fully charged against the customer's bucket 204, in order to obtain the necessary allocation of the appropriate resource(s). As can be seen, such an approach causes the customer's bucket to be empty, which means that the customer would have to wait for two more tokens to appear in the customer bucket 204 in order to be able to perform another such request.

Figure 2C:
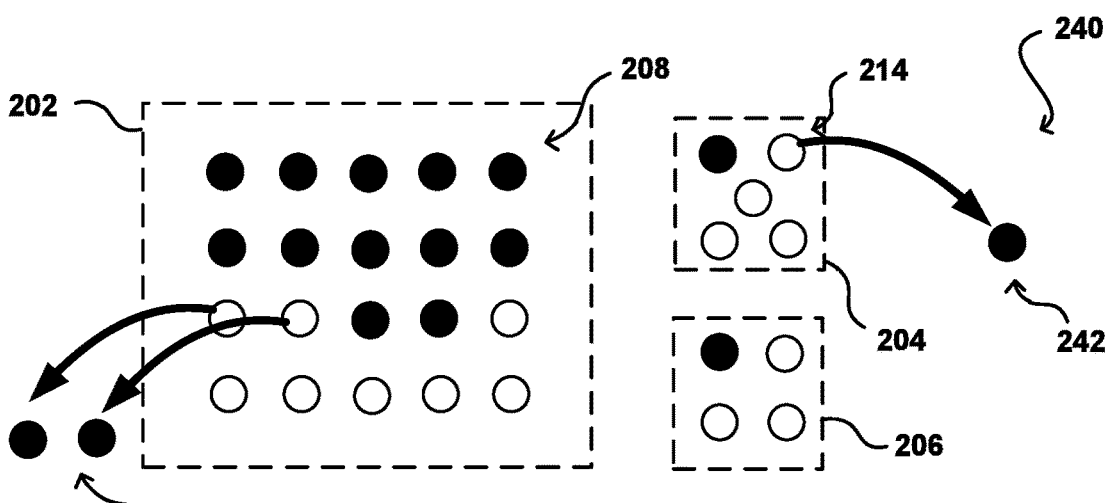

FIG. 2(c) illustrates a situation 240 in accordance with at least some embodiments, wherein the global bucket 202 has more than a threshold number of tokens available, such that a customer can operate at faster than the customer's guaranteed (or "minimum") rate. In this example, the customer again has two tokens 222 charged against the global throttle. A determination of the fill amount of the global bucket can be used to determine a rate at which the customer can do work, or the rate at which tokens will be charged against the customer bucket. In this example the customer is able to run at a maximum rate, such that only half of the number tokens 242 for the request is charged against the customer bucket 204. Since a token is available in the customer bucket, the access can be granted without draining the customer bucket of both tokens 214. Since there are excess tokens in the global bucket, an amount of resource capacity is not being used by the customers so there can be some advantage to the provider in allowing the customer to charge less than the full number of tokens to the customer bucket. Further, as illustrated such an approach leaves one token in the customer bucket 204, which enables the customer bucket to fill more quickly and enables the customer to do work at a faster pace.

In some embodiments, a customer might be allowed to charge less than the full number of tokens for a request as long as at least one token is available in the global bucket. Such an approach can be undesirable in at least some situations, however, as other customers, background traffic, or other sources might use those tokens to access resources, and using up all the tokens would prevent those sources from being able to access the resources. Further, such an approach can enable one customer to tie up the resources even though the customer only paid for, or otherwise obtained, a certain amount of guaranteed access. Various other fairness and performance-related reasons can provide motivation to not allow a customer to charge less than a minimum amount of tokens for a request to the customer bucket.

Accordingly, approaches in accordance with various embodiments can provide a customer with at least two rates at which work can be done by the resources, a minimum rate and a maximum rate. In at least some embodiments, the minimum rate can correspond to the guaranteed fill rate of the customer bucket. Using the minimum rate, the customer can always do work at least at the rate at which the customer bucket is able to fill, as the full number of tokens is charged against the customer bucket for a request. The maximum rate can indicate the minimum amount that a customer can charge against the customer bucket for a request, dictating the speed at which the customer can have work performed by the resources. If there are tokens in the global bucket, and the customer is below the customer's maximum rate, the customer can charge the customer bucket a minimum number of tokens that will not cause the customer to exceed the maximum rate.

In at least some embodiments, however, there can be various criteria or conditions at which each rate is applied, and there can be rates in between the minimum and maximum rates applied at various times. For example, there might be a global threshold, such as 50% of the global bucket size, where customers can utilize tokens up to their maximum rate as long as the number of tokens in the global bucket at least meets the global threshold. If the number of tokens in the global bucket drops to (or below) zero, the customers might only be able to obtain their minimum rate, which corresponds to the rate at which their respective buckets can fill. For global bucket fill levels less than the global threshold, but above zero, the customers might be able to get some rate in-between the minimum and maximum rate, which can be a function of the fill level. For example, the rate might decrease linearly or non-linearly with a decrease in global fill level, etc., which can affect the amount or percentage of a token that the customer must charge against the respective customer bucket. Various other factors can affect the provided rate as well within the scope of the various embodiments.

As discussed, such an approach can be advantageous in at least some situations as customers can have the ability to do work at a faster rate when capacity is available, which helps improve utilization and spread out processing, and further improves the customer experience. The ability to throttle or manage this excess usage enables a provider to ensure that other customers or traffic can still meet their respective guarantees.

As mentioned, the global bucket can also be used for other types of work as well. For example, in a multi-tenant environment there can be a number of communications or I/O operations that need to be performed in order to maintain the system. Even though this work is not customer work, it still requires an amount of bandwidth and other access in the environment. It can be desirable to allow the customer to go as fast as possible, but it still can be desirable to allocate at least a portion of the tokens in the token bucket to the background traffic, or at least set the maximum rates on the customers to a level where there will often be tokens that can be used for background traffic and other such purposes. Further, when there are tokens available it can be desirable to allow the background traffic to obtain up to a maximum rate of tokens from the global bucket as well, although in at least some embodiments customer traffic can be given priority. When managing background traffic in at least some embodiments, a special local-style token bucket can also be allocated that can be combined with the global bucket to form a "background-opportunistic" token bucket. Such a token bucket can function like a single customer throttle, but can be shared among some or all of the background activity that the server has to perform. In such embodiments, there is not only a reservation on background traffic from the global throttle, but also dedicated "local" style throttle.

The following sections provide more details about algorithms and formulas that can be used to implement such approaches in accordance with various embodiments. For example, the capacity of a multi-tenant environment, in some units (e.g., bandwidth or IOPS), can be designated as C, and there can be multiple tenants each with a respective assigned capacity $T(1), T(2), \ldots, T(n)$. In conventional approaches it could be required that $T(1)+T(2)+ \ldots +T(n) \leq C$. By doing this, every customer or "tenant" is always able to get the capacity that they are assigned. A conventional approach is to build a throttle (either token bucket or the equivalent leaky bucket) for each of $T(1), T(2), \ldots, T(n)$ with each its assigned capacity. A problem with such an approach is that, unless all tenants are using their capacity, some capacity will go unused and wasted.

Approaches in accordance with various embodiments utilize a min/max throttling apparatus such that each tenant can be given a minimum capacity Tmin(1), Tmin(2) . . . , Tmin(n) such that Tmin(1)+Tmin(2)+ . . . +Tmin(n)≤C. Each tenant also can be given a maximum capacity that will be provided if the overall system has the resources, given by: Tmax(1)≥Tmin(1), Tmax(2)≥Tmin(2), . . . , Tmax(n)≥Tmin (n), and Tmax(i)≤R for all i, where R is the global bucket rate. The tenant is guaranteed a respective minimum capacity in any situation, in at least some embodiments, and the tenant is promised that the tenant can get a proportional slice of the respective maximum capacity based at least in part upon availability in the system.

In one example, tenant A pays for a minimum capacity of 1.0 and a maximum capacity of 2.0. Tenant B asks for a minimum capacity of 1.0 and a maximum capacity of 3.0. Both tenants understand that under a fully loaded system their respective capacity may not be more than 1.0. Both tenants also understand that, under favorable conditions, they will get their respective maximum capacity. Finally, in those cases where there is some spare capacity but not enough spare capacity for both tenants, tenant B may get a larger portion of the spare capacity than tenant A. In this way, it would be possible to charge tenant B more for B's opportunistic capacity than tenant A.

As another example, a resource provider, being aware that it might want to over-provision its resources, may sell the maximum capacity and promise to deliver it with a certain fidelity. The provider, may, for example, set the minimum capacity to 90% of the maximum capacity uniformly across all tenants. In the case where this maximum capacity cannot be reached, the customer will still receive at least the minimum. If, using a conventional approach, the throttles are set to over capacity, where T(1)+T(2)+ . . . +T(n)>C, then the actual capacity of the entire system can be overrun and cause severe performance degradations. Using an opportunistic approach as discussed herein, the provider can over-provision promises to the tenants while having a minimum guarantee to the tenant and no possibility of overrunning the system resources.

In at least some embodiments, a global token bucket is built for the capacity of the system. Unlike a conventional token bucket implementation that blocks until the amount requested is available, such an implementation can take the amount requested, whether it is present or not (i.e., possibly setting the level of the bucket to a negative value), and report back to the caller the current bucket level. All tenants can use this global token bucket, as well as each having their own token bucket that is provisioned for each their minimum, Tmin.

Acquiring a quantity X from an opportunistic token bucket can be performed in one embodiment by first acquiring X from the shared global token bucket. Y can be the resultant global token bucket level, which might be negative. We can set Z=max(0.0, min (1.0, Y/<global-bucket-size>/2)). At this point, we can acquire Q=X(1+Z((Tmin/Tmax)−1)) from the local token bucket. This equation results in acquiring a token of size X if Z=0.0 and a token of size X(Tmin/Tmax) if Z=1.0. The token size can vary linearly between these two values. Such an "acquire" can be the normal token bucket acquire that will wait until the level of the bucket will allow it. In this way, when the system is stressed, the global token bucket level can find a "sweet spot" between empty and half full, for example, and then all of the individual token buckets can have the same percentage of their respective "boost ratios," as may be dictated by Tmax/Tmin.

Figure 3:
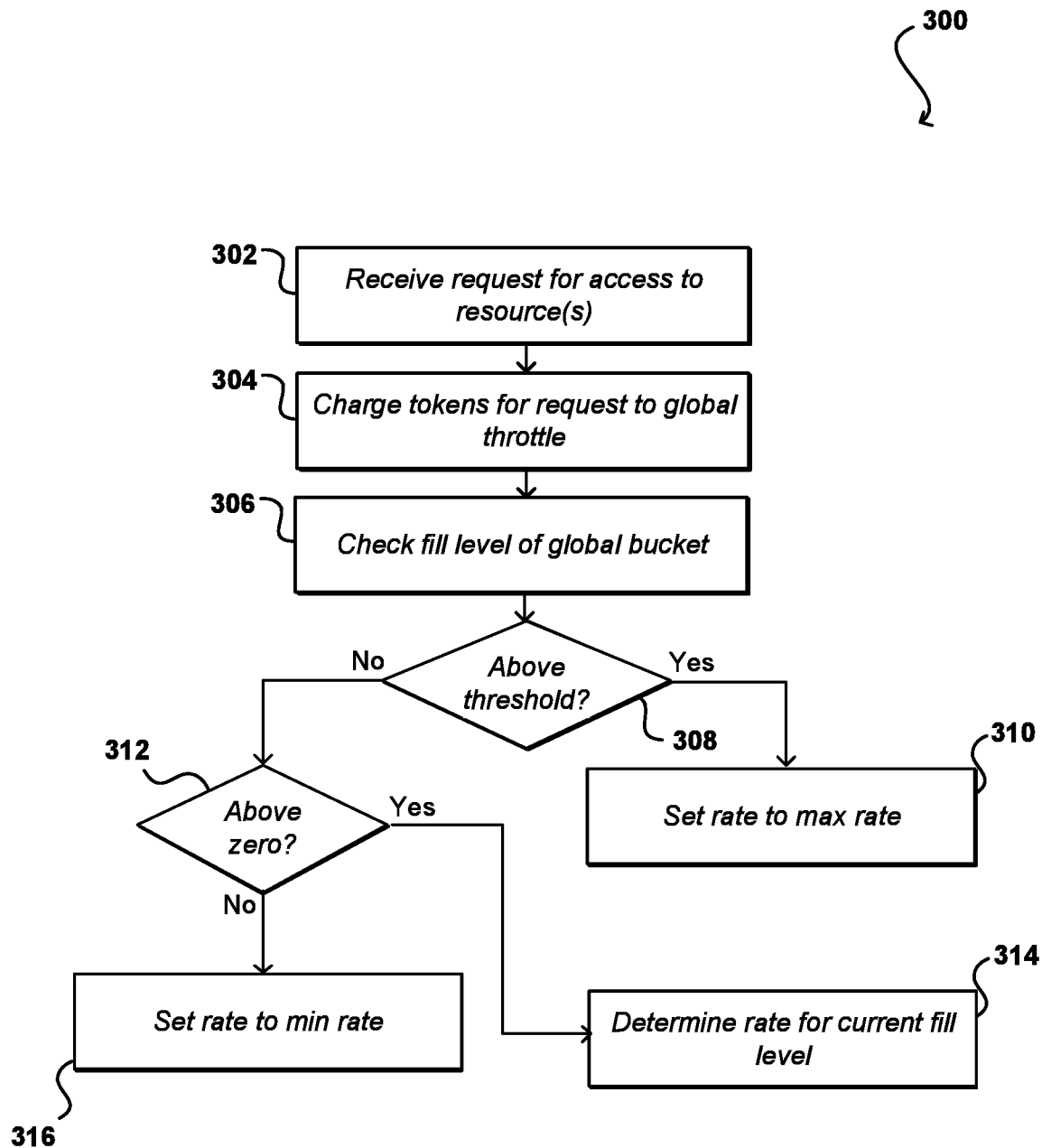
FIG. 3 illustrates a first portion of an example process for managing access to resources that can be used in accordance with various embodiments.

FIG. 3 illustrates a first portion of an example process 300 that can be utilized in accordance with various embodiments. It should be understood that there can be additional, fewer, or alternative steps performed in similar or alternative orders, or in parallel, within the scope of the various embodiments unless otherwise stated. In this example, a request is received 302 from a customer, where that request requires access to, or work performed by, at least one shared resource in a multi-tenant environment. The number of tokens needed for the request is determined and charged 304 against the global bucket, or global throttle. A current fill level of a global token bucket can be checked 306, and a determination made 308 as to whether the fill level is above a global threshold. If so, the current work rate for the customer can be set 310 to a maximum rate for that customer. If the fill level is not above the global threshold, but it is determined 312 that the fill level is above zero, a rate can be determined 314 for the customer that is between the minimum and maximum rates, based at least in part upon the fill level of the global bucket. If the fill level is at or below zero, the rate for the customer can be set 316 to the minimum rate.

Figure 4:
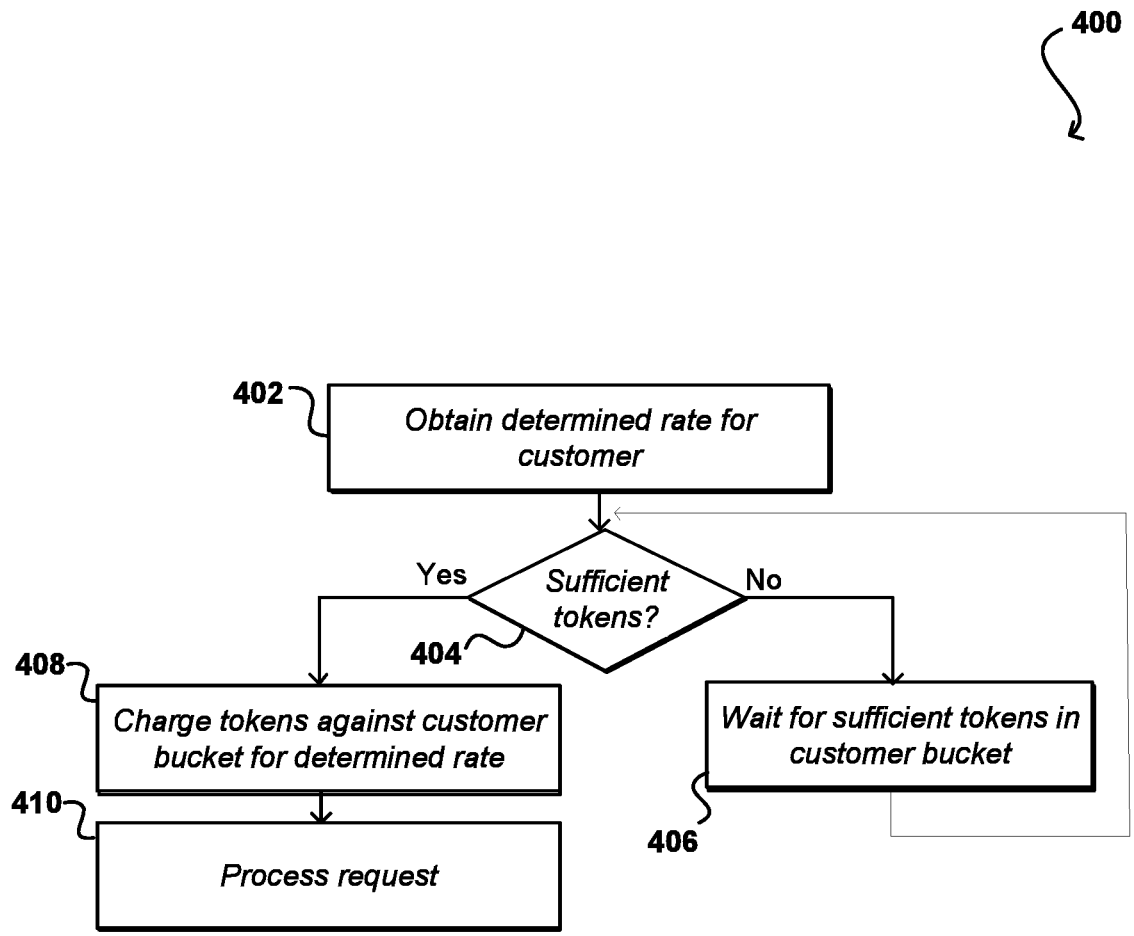
FIG. 4 illustrates a second portion of an example process for managing access to resources that can be used in accordance with various embodiments.

FIG. 4 illustrates a second portion 400 of the process that continues from that illustrated in FIG. 3. In this portion, the determined rate for the customer is obtained 402, which can determine the amount of tokens that should be charged to the customer bucket for the request. A determination can be made 404 as to whether there are a sufficient number of tokens in the client bucket. If not, the request can be throttled and forced to wait 406 for a sufficient number of tokens to be available in the customer bucket. In at least some embodiments, throttling at the customer bucket prevents the customer from obtaining tokens for an additional request from the global bucket. Once a sufficient number or tokens is available in the customer bucket, the number of tokens is charged 408 against the customer bucket, and the request processed 410. The buckets can then refill at their respective rates.

In some embodiments it can be desirable to utilize a component such as a "stress checker" to determine the current load on the multi-tenant environment and/or set of resources by measuring factors such as the average read latency and the amount of dirty pages in the page cache. When implementing a stress checker, the global throttle can be set to a rate that the actual resource can provide and a mechanism can be installed to verify that that resource is performing properly. If the monitored resource does not perform as expected then the amount of all throttles (e.g., global and local) can be reduced proportionally to a level such that the system is actually able to handle in its impaired state. In the case of throttling I/O, there is the danger that the throttle lets through more I/O than the system can handle. This can happen if, for example, the capacity of the system was not estimated properly or if the state of the system goes bad, such as a disk or SSD going on the fritz. A stress checker can constantly measure the latencies of reads and the amount of unwritten data in a cache, such as a page cache. The stress checker can distill its measurements into a single number 0.0≤x≤2.0. A value of 0.0 can indicate that the system is lightly loaded, where all of the reads are within a determined specification and the number of dirty pages in the page cache is below a certain amount. A value of 1.0 can indicate that the system is "at capacity", meaning that the read latency is still acceptable and that the page cache is able to write out the data at the same rate that the pages are becoming dirty. A value greater than 1.0 can indicate that the system is over-loaded, in that either reads are out of specification or that pages are becoming dirty faster than they can be written.

A "system load aware token bucket" then can be used, where the stress checker measurement is taken into account. The system load aware token bucket can have two modes, including a provisioned mode and an un-provisioned mode. Both modes can reduce the bucket size and bucket fill rate based on the current system load as measured by the stress checker. In the case of the provisioned mode, it can be assumed that all token buckets are already specified in a way that they will not overwhelm the system. In this mode the system should never go past its ability to grant the requests at the rate of all of the provisioned token buckets. The system load aware token bucket therefore only reduces the bucket size and bucket fill rate in the case where the stress checker reports a load that is over 1.0. The bucket size and bucket fill rate are reduced linearly for a load between 1.0 and 2.0, where the bucket fill rate is set to 0 if the load is at 2.0. In the case of un-provisioned mode the throttle is set without a global knowledge that the desired bandwidth can even be achieved. This limits bandwidth to a maximum but also allows the possibility that such a maximum load would overwhelm the system. In this case the system load aware token bucket will reduce the bucket size and bucket fill rate whenever the stress checker reports a load that is over 0.0, setting the bucket size and bucket fill rate to 0 if the stress checker reports a load of 1.0 or more, and to a linear amount between 0 and the maximum for loads between 0.0 and 1.0.

At least some embodiments can utilize a global bandwidth meter. In such an embodiment, the basic token bucket algorithm can be modified so that it never actually waits for the amount requested, allowing the bucket level to go negative. In this variation on the token bucket, it is used to "meter" or "check" that the bandwidth prescribed by the bucket fill rate is not being exceeded. A process can use such a meter by acquiring from a token bucket meter, and receiving back, the current level of the bucket. If the current level of the bucket is not negative then the bandwidth specified by the token bucket meter has not been exhausted. A global bandwidth meter can be used in some embodiments that measures all of the bandwidth being used across all of the separate individual throttles. This allows measuring whether or not all bandwidth is being used. This serves as a tool to allow a provisioned throttle to go beyond its bandwidth capacity by, effectively, using other throttles' unused capacities.

In at least some embodiments an opportunistic token bucket combines a normal token bucket throttle with a global bandwidth meter. The way such an opportunistic token bucket works is that the process gives it two token sizes to claim. The first token size is the full size, representing the actual bandwidth that needs to be consumed. The second token size may be smaller, representing a smaller amount to be taken from the normal token bucket so that the process can obtain some unused bandwidth from the system. The opportunistic token bucket first goes to the global bandwidth meter" and claims the first token size. The global bandwidth meter returns the current global bucket level. If the global bucket is half full or more, or another such global threshold value, then the global bandwidth is under-used and so the process is told to proceed to its normal token bucket and ask for the smaller token, thus increasing its bandwidth. If the global bandwidth meter returns a bucket level that is negative, then this represents a system that has exhausted its global bandwidth and that no obtaining of bandwidth is possible. In this case the process is instructed to take the larger token from its own token bucket, without increasing its bandwidth beyond what was originally provisioned. In the case where the global bandwidth meter reports a current bucket level that is between empty and half full, the process can be instructed to take a token size in between the larger and smaller sizes, linearly or otherwise on that range.

In at least some embodiments, there can be separate global throttle buckets for different resources managed by the resource manager. In a single global bucket model, the size and/or fill rate of the bucket cannot be more than the slowest resource supporting the global bucket. Separate global buckets can help to better utilize all the resources in the system. Also, API requests (which can be completely serviced by faster resources) do not have to be throttled as aggressively as the other requests in at least some embodiments. In this model, each resource can have a separate global token bucket for which the size and fill rate is set to no greater than can be provided by the resource. Depending on the type of request, the opportunistic token bucket will now go to only those resource buckets which it will be using and/or accessing. The function to determine the size of token to be fetched from the local token bucket can now be dependent on the lowest fill level among the global buckets used.

In at least some embodiments, there can be separate local token buckets for different resources managed by the resource manager and/or available through the multi-tenant environment. Such usage provides support to fine grained provisioning of the resources in the system. For example, a customer can provision two tokens per unit time for a write request and four tokens per unit time for a read request. This model utilizes the separate global token bucket model to throttle the resources at the global level.

As mentioned, there can be certain background activities in a multi-tenant environment that do not directly affect customer requests to read or write data. All such traffic can be throttled by a common global throttle that is set to have a minimum provisioned bandwidth and which is also allowed to burst, via the opportunistic mechanism, to a maximum bandwidth. In one embodiments, the throttle implementation can utilize one global bandwidth meter (system load aware) to measure all bandwidth, one background token bucket (system load aware) to be shared by all volumes for background I/O, and a one-per-volume foreground token bucket (system load aware) to throttle volume foreground requests. The background and foreground throttles can each be combined with the global bandwidth meter to form opportunistic versions of each of them, allowing the provisioned bandwidth to be exceeded if desired and if the global bandwidth allows it.

A number of global parameters can be set on the throttle, as may include, for example:

max_burst_ms—This refers to a number of milliseconds that the token bucket will be set to for each of the foreground throttles and the background throttle.

throttle_request_size_increment—This refers to the size of an I/O. A token of size 1.0 is taken, for each I/O less than or equal to this size, from the volume's token bucket. Otherwise the token size is set to the size of the request divided by the throttle_request_size_increment.

max_throttle_iops—This refers to the token bucket fill rate, in IOPS, for un-provisioned volumes.

throttle_max_request_size_increment—This refers to the maximum size of an I/O. This can be set to a value larger than throttle_request_size_increment, in which case the volume's throttle can specify a smaller token size by giving an opportunistic token size of the request size divided by the throttle_max_request_size_increment. If the global bandwidth is available, this will allow a volume to increase its bandwidth by having larger IOPS being issued for a smaller token size.

global_bandwidth_throttle_kbps—This can be set to the system's global bandwidth, in kilobytes per second (or another appropriate unit). The sum of all of the provisioned IOPS (including the background provisioned iops) should not exceed this number in at least some embodiments.

global_bandwidth_throttle_burst_ms—This refers to the token bucket size of the global bandwidth throttle, in milliseconds.

background_throttle_provisioned_kbps—This refers to the provisioned background bandwidth, in kilobytes per second (or another appropriate unit).

background_throttle_max_kbps—This refers to the maximum background bandwidth that can be consumed if there is global bandwidth available.

In the case of a foreground throttle request, such as a user read or write, the token size can be figured out by dividing the length of the request by the throttle_request_size_increment. The token size can be set to at least 1.0. The process can then figure out the opportunistic token size by dividing the length of the request by throttle_max_request_size_increment, with the opportunistic token size being set to at least 1.0. The larger token size can be acquired from the global token meter, taking note of the current level of that meter. This can be performed without blocking. Based on the global meter's bucket level, a possibly smaller token can be acquired, but no smaller than the opportunistic token size, from the volume's system load aware token bucket.

In some cases there can be background requests that are blocking foreground requests. In such cases the throttle of a volume can be is used, but with a much smaller opportunistic token size, so that the foreground bandwidth is not drastically affected if the global bandwidth is available. In this case the token size can be figured out by dividing the length of the request by throttle_request_size_increment. The token size can be set to at least 1.0, and the opportunistic token size can also be set to 1.0. The larger token size can be acquired from the global token meter, taking note of the current level of that meter. This can be performed without blocking. Based on the global meter's bucket level a possibly smaller token can be acquired, but no smaller than the opportunistic token size, from the volume's system load aware token bucket.

A background throttle request can be throttled by the global background system load aware token bucket. First, the token size is figured out by dividing the length of the request by throttle_request_size_increment. The token size can be set to at least 1.0. The opportunistic token size can be determined by dividing by background_throttle_max_kbps and then multiplying by background_throttle_provisioned_kbps. The opportunistic token size can be kept at a value of at least 1.0. The larger token size can be acquired from the global token meter, taking note of the current level of that meter. This can be performed without blocking. Based on the global meter's bucket level a possibly smaller token can be acquired, but no smaller than the opportunistic token size, from the global background system load aware token bucket.

Figure 5:
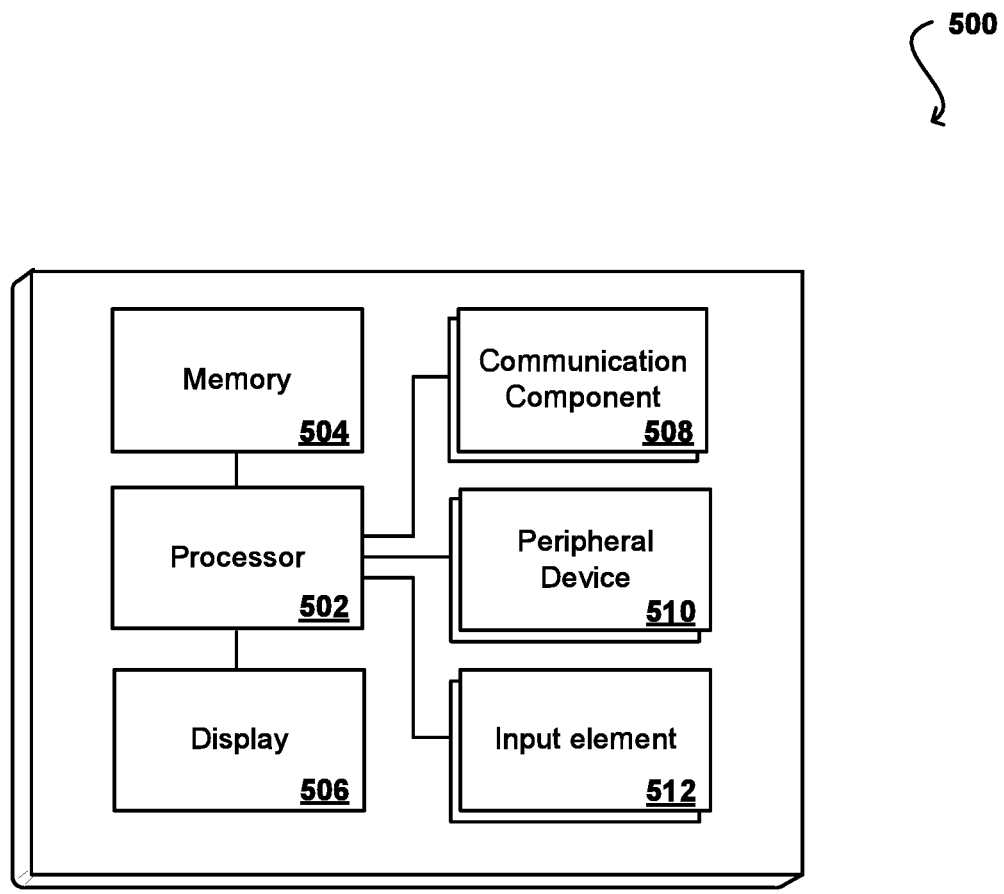
FIG. 5 illustrates a set of components of an example computing device that can be utilized in accordance with various embodiments.

FIG. 5 illustrates a logical arrangement of a set of general components of an example computing device 500 that can be utilized in accordance with various embodiments. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers.

In some embodiments, the computing device 500 can include one or more communication components 508, such as a network, Wi-Fi, Bluetooth, RF, wired, or wireless communication system. The device in many embodiments can communicate with a network, such as the Internet, and may be able to communicate with other such devices. In some embodiments the device can include at least one additional input device 512 and/or peripheral device 510 able to receive and/or process conventional input. This conventional input can be provided by, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a request for usage of at least one resource by a computing system in a multi-tenant computing environment that includes a plurality of computing resources in communication via a network;
   when the requested usage exceeds a threshold usage of the at least one resource, delaying processing of the request;
   when the requested usage is below the threshold, determining an amount of usage needed to process the request;
   charging the amount of usage against a global available usage amount associated with the at least one resource;
   determining a portion of the amount of usage to be charged against a requestor, available usage amount for the request based at least in part on a fill level of the global available usage amount; and
   processing the request based at least in part upon a determination that the portion of the amount of usage is available in the requestor available usage amount.

2. The computer-implemented method of claim 1, wherein when the fill level of the global available usage amount is greater than 50%, charging up to the amount of usage against the global available usage amount.

3. The computer-implemented method of claim 2, wherein when the fill level of the global available usage amount is less than 50%, charging up to the amount of usage to the requestor available usage amount.

4. The computer-implemented method of claim 3, further comprising:
   determining the requestor available usage amount is less than or equal to the amount of usage; and
   throttling subsequent requests until the requestor available usage amount is refilled.

5. The computer-implemented method of claim 1, wherein the requested usage is provided at up to a maximum rate for the requestor when the global available usage amount at least meets a global threshold.

6. The computer-implemented method of claim 1, wherein the requested usage is provided at up to an intermediate rate for the requestor when the global available usage amount is less than the global threshold but above a global minimum threshold.

7. The computer-implemented method of claim 6, wherein the intermediate rate is a function of the global fill rate and a current global available amount of usage based on the global fill threshold and the global minimum threshold.

8. An apparatus comprising:
   at least one processor; and at least one memory device including instructions that, when executed by the at least one processor, cause the computing system to:
  receive a request for usage of at least one resource by a computing system in a multi-tenant computing environment that includes a plurality of computing resources in communication via a network;
  when the requested usage exceeds a threshold usage of the at least one resource, delay processing of the request;
  when the requested usage is below the threshold, determine an amount of usage needed to process the request;
  charge the amount of usage against a global available usage amount associated with the at least one resource;
  determine a portion of the amount of usage to be charged against a requestor, available usage amount for the request based at least in part on a fill level of the global available usage amount; and
  process the request based at least in part upon a determination that the portion of the amount of usage is available in the requestor available usage amount.

9. The apparatus of claim 8, wherein when the fill level of the global available usage amount is greater than 50%, charging up to the amount of usage against the global available usage amount.

10. The apparatus of claim 9, wherein when the fill level of the global available usage amount is less than 50%, charging up to the amount of usage to the requestor available usage amount.

11. The apparatus of claim 10, wherein the at least one memory device includes instructions that, when executed by the at least one processor, further cause the computing system to:
  determine the requestor available usage amount is less than or equal to the amount of usage; and
  throttle subsequent requests until the requestor available usage amount is refilled.

12. The apparatus of claim 8, wherein the requested usage is provided at up to a maximum rate for the requestor when the global available usage amount at least meets a global threshold.

13. The apparatus of claim 8, wherein the requested usage is provided at up to an intermediate rate for the requestor when the global available usage amount is less than the global threshold but above a global minimum threshold.

14. The apparatus of claim 13, wherein the intermediate rate is a function of the global fill rate and a current global available amount of usage based on the global fill threshold and the global minimum threshold.

15. A non-transitory computer-readable storage medium storing instructions that, when executed by at least one processor of a computing system, cause the computing system to:
  receive a request for usage of at least one resource by a computing system in a multi-tenant computing environment that includes a plurality of computing resources in communication via a network;
  when the requested usage exceeds a threshold usage of the at least one resource, delay processing of the request;
  when the requested usage is below the threshold, determine an amount of usage needed to process the request;
  charge the amount of usage against a global available usage amount associated with the at least one resource;
  determine a portion of the amount of usage to be charged against a requestor, available usage amount for the request based at least in part on a fill level of the global available usage amount; and
  process the request based at least upon a determination that the portion of the amount of usage is available in the requestor available usage amount.

16. The non-transitory computer-readable storage medium of claim 15, wherein when the fill level of the global available usage amount is greater than 50%, charging up to the amount of usage against the global available usage amount.

17. The non-transitory computer-readable storage medium of claim 16, wherein when the fill level of the global available usage amount is less than 50%, charging up to the amount of usage to the requestor available usage amount.

18. The non-transitory computer-readable storage medium of claim 17, storing instructions that, when executed by the at least one processor, further cause the computing system to:
  determine the requestor available usage amount is less than or equal to the amount of usage; and
  throttle subsequent requests until the requestor available usage amount is refilled.

19. The non-transitory computer-readable storage medium of claim 15, wherein the requested usage is provided at up to a maximum rate for the requestor when the global available usage amount at least meets a global threshold.

20. The non-transitory computer-readable storage medium of claim 15, wherein the requested usage is provided at up to an intermediate rate for the requestor when the global available usage amount is less than the global threshold but above a global minimum threshold, and wherein the intermediate rate is a function of the global fill rate and a current global available amount of usage based on the global fill threshold and the global minimum threshold.

* * * * *